(12) United States Patent
Dunlop

(10) Patent No.: US 9,182,758 B1
(45) Date of Patent: Nov. 10, 2015

(54) COMPUTER-IMPLEMENTED SYSTEM AND METHOD FOR CAPABILITY ZONE-BASED MANUFACTURING QUALITY CONTROL

(71) Applicant: Michael H S Dunlop, Bellevue, WA (US)

(72) Inventor: Michael H S Dunlop, Bellevue, WA (US)

( * ) Notice: Subject to any disclaimer, the term of this patent is extended or adjusted under 35 U.S.C. 154(b) by 0 days.

(21) Appl. No.: 14/634,636

(22) Filed: Feb. 27, 2015

Related U.S. Application Data

(60) Provisional application No. 61/946,133, filed on Feb. 28, 2014.

(51) Int. Cl.
*G05B 19/418* (2006.01)

(52) U.S. Cl.
CPC ................................ *G05B 19/41875* (2013.01)

(58) Field of Classification Search
USPC ............................................................ 702/84
See application file for complete search history.

(56) References Cited

U.S. PATENT DOCUMENTS

2007/0192060 A1* 8/2007 Yam et al. ..................... 702/181

OTHER PUBLICATIONS

NIST handbook , 44, 2015, Specifications, Tolerances, and Other Technical Requirements for Weighing and Measuring Devices, as adopted by the 89th National Conference on Weights and Measures 2004, 332 pages.*
Wikipedia., "Taguchi Methods." Retrieved from the Internet: URL:http://en.wikipedia.org/wiki/Taguchi_methods, Printed on Sep. 6, 2015.
Moresteam, "Statistical Process Controls," retrieved from the internet: https://www.morestream.com/toolbox/statistical-process-control-spc.cfm, Printed on Sep. 13, 2015.
Quality Training Portal.com, "Control Chart Formulas," retrieved from the Internet: http://www.qualitytrainingportal.com/resources/spc/form_3839a_app1.htm (retrieved Sep. 5, 2015).

* cited by examiner

*Primary Examiner* — Tung S Lau
(74) *Attorney, Agent, or Firm* — Patrick J. S. Inouye; Leonid Kisselev

(57) ABSTRACT

A computer-implemented system and method for capability zone-based manufacturing quality control are provided. A specification for manufacturing a part feature is obtained, the specification including a nominal and a tolerance. A plurality of measurements for the feature are obtained. A difference is determined between the nominal and each of the measurements. The difference for each of the measurements is compared to the tolerance. Each of the measurements is assigned into one of a plurality of capability zones of measurements based on the comparison. Visual representations of the capability zones into which the measurements were assigned are displayed.

20 Claims, 17 Drawing Sheets

| Operator | Part # | Feature | Specifications | Low | High | Measurement | UM | Date |
|---|---|---|---|---|---|---|---|---|
| James Hawkins | Patel 10.700 | Floor Thickness (F13) | 0.12+0.01,-0.01 | -0.01 | 0.01 | 0.1215 | 15 | 09/14/2009 |
| James Hawkins | Patel 11.700 | Shear Tie Floor Thickness (STFT1) | 0.1+0.05,-0.05 | -0.01 | 0.01 | 0.101 | 10 | 09/14/2009 |
| James Hawkins | Patel 11.700 | Floor Thickness (FT4) | 0.085+0.01,-0.01 | -0.01 | 0.01 | 0.086 | 10 | 09/14/2009 |
| James Hawkins | Patel 11.700 | Floor Thickness (FT1) | 0.12+0.01,-0.01 | -0.01 | 0.01 | 0.121 | 10 | 09/17/2009 |
| James Hawkins | Patel 10.700 | Floor Thickness (FT4) | 0.07+0.005,-0.005 | -0.005 | 0.005 | 0.0705 | 10 | 09/18/2009 |
| James Hawkins | Patel 11.700 | Shear Tie Floor Thickness (STFT1) | 0.1+0.05,-0.05 | -0.01 | 0.01 | 0.101 | 10 | 09/18/2009 |
| James Hawkins | Patel 10.700 | Wall Thickness (WT2) | 0.27+0.01,-0.01 | -0.01 | 0.01 | 0.271 | 10 | 09/18/2009 |
| James Hawkins | Patel 10.700 | Floor Thickness (FT3) | 0.12+0.01,-0.01 | -0.01 | 0.01 | 0.121 | 10 | 09/19/2009 |
| James Hawkins | Patel 10.700 | Wall Thickness (WT2) | 0.41+0.01,-0.01 | -0.01 | 0.01 | 0.411 | 10 | 09/19/2009 |
| James Hawkins | Patel 11.700 | Floor Thickness (FT4) | 0.085+0.01,-0.01 | -0.01 | 0.01 | 0.086 | 10 | 09/24/2009 |
| James Hawkins | Patel 11.700 | Wall Thickness (WT2) | 0.27+0.01,-0.01 | -0.01 | 0.01 | 0.271 | 10 | 09/24/2009 |
| James Hawkins | Patel 11.700 | Shear Tie Floor Thickness (STFT1) | 0.1+0.05,-0.05 | -0.01 | 0.01 | 0.101 | 10 | 09/24/2009 |
| James Hawkins | Patel 11.700 | Rib Top Thickness (RTT1) | 0.1+0.05,-0.05 | -0.01 | 0.01 | 0.101 | 10 | 09/24/2009 |
| James Hawkins | Patel 11.700 | Wall Thickness (WT3) | 0.1+0.05,-0.05 | -0.01 | 0.01 | 0.101 | 10 | 09/25/2009 |
| James Hawkins | Patel 11.700 | Shear Tie Thickness (STT1) | 0.1+0.05,-0.05 | -0.01 | 0.01 | 0.101 | 10 | 09/25/2009 |
| James Hawkins | Patel 11.700 | Wall Thickness (WT2) | 0.27+0.01,-0.01 | -0.01 | 0.01 | 0.271 | 10 | 09/25/2009 |
| James Hawkins | Patel 11.700 | Wall Thickness (WT2) | 0.41+0.01,-0.01 | -0.01 | 0.01 | 0.411 | 10 | 09/25/2009 |
| James Hawkins | Patel 11.700 | Floor Thickness (FT5) | 0.07+0.005,-0.005 | -0.005 | 0.005 | 0.0705 | 10 | 09/25/2009 |
| James Hawkins | Patel 11.700 | Shear Tie Thickness (STT1) | 0.1+0.05,-0.05 | -0.01 | 0.01 | 0.101 | 10 | 09/25/2009 |
| James Hawkins | Patel 11.700 | Wall Thickness (WT2) | 0.41+0.01,-0.01 | -0.01 | 0.01 | 0.411 | 10 | 09/26/2009 |
| James Hawkins | Patel 11.700 | Wall Thickness (WT2) | 0.27+0.01,-0.01 | -0.01 | 0.01 | 0.271 | 10 | 09/26/2009 |
| James Hawkins | Patel 10.700 | Floor Thickness (FT1) | 0.1+0.05,-0.05 | -0.01 | 0.01 | 0.101 | 10 | 09/27/2009 |
| James Hawkins | Patel 10.700 | Floor Thickness (FT4) | 0.085+0.01,-0.01 | -0.01 | 0.01 | 0.086 | 10 | 09/27/2009 |
| James Hawkins | Patel 11.700 | Wall Thickness (WT2) | 0.27+0.01,-0.01 | -0.01 | 0.01 | 0.271 | 10 | 09/27/2009 |
| James Hawkins | Patel 11.700 | Wall Thickness (WT2) | 0.27+0.01,-0.01 | -0.01 | 0.01 | 0.271 | 10 | 09/02/2009 |
| James Hawkins | Patel 11.700 | Shear Tie Floor Thickness (STFT1) | 0.1+0.05,-0.05 | -0.01 | 0.01 | 0.101 | 10 | 10/12/2009 |
| James Hawkins | Patel 11.700 | Floor Thickness (FT5) | 0.07+0.005,-0.005 | -0.005 | 0.005 | 0.0705 | 10 | 10/12/2009 |

-Select Manufacturer-
James Hawkins
-Select Part-
-Select Feature-
-Select Material-
-Select Machine-
-Select Tools-
-Select Processes- Capability Score: 8 5 . 6 4

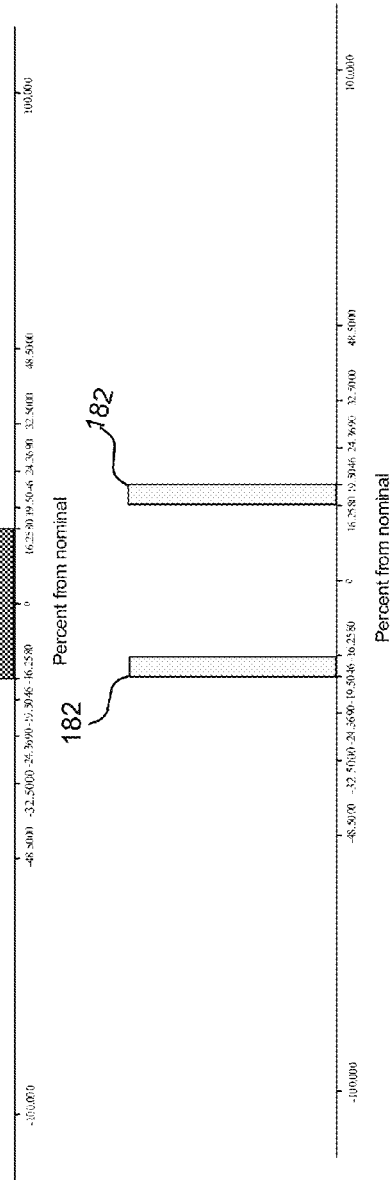
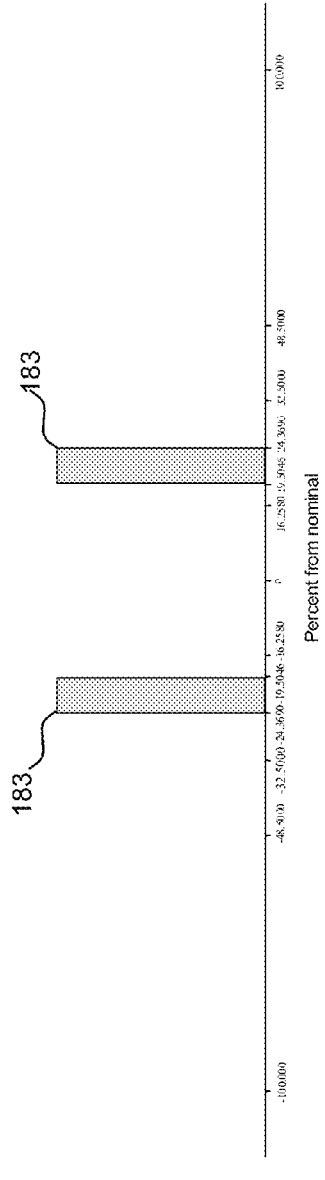
Fig. 15 A.
180
Fig. 15 B.
180
Fig. 15 C.
180

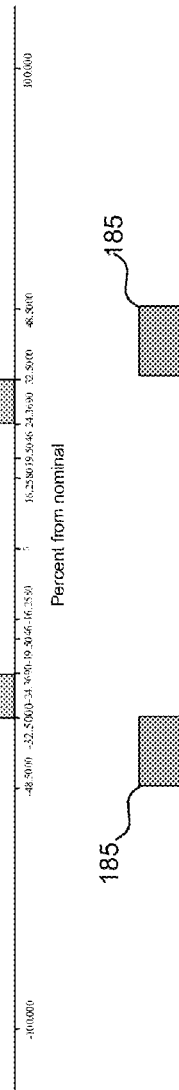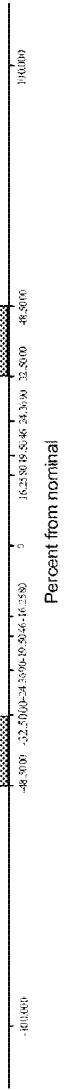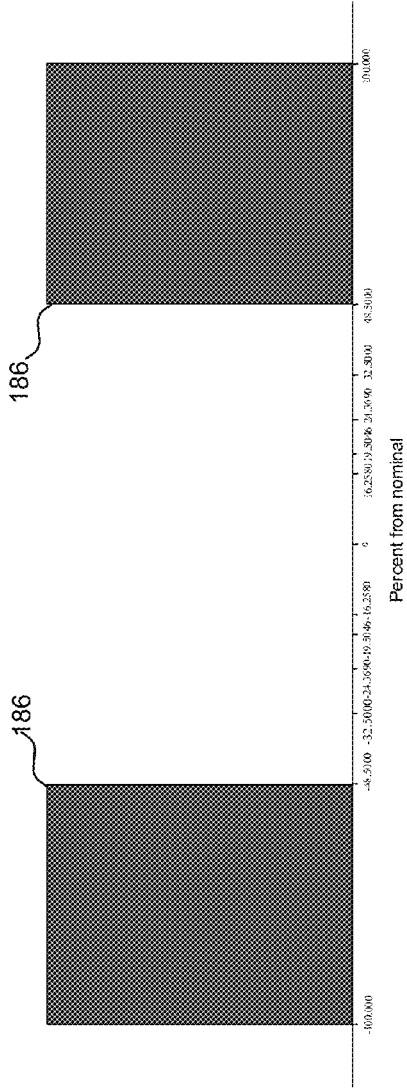
Fig. 15 D.
180
Fig. 15 E.
180
Fig. 15 F.
180

180

COMPUTER-IMPLEMENTED SYSTEM AND METHOD FOR CAPABILITY ZONE-BASED MANUFACTURING QUALITY CONTROL

CROSS-REFERENCE TO RELATED APPLICATION

This non-provisional patent application claims priority under 35 U.S.C. §119(e) to U.S. Provisional Patent Application Ser. No. 61/946,133, filed Feb. 28, 2014, the disclosure of which is incorporated by reference.

FIELD

The present invention relates in general to parts quality control and, in particular, to a computer-implemented system and method for capability zone-based manufacturing quality control.

BACKGROUND

Quality control is an essential component of parts manufacturing and can be regulated at statutory, administrative, and industry levels. For example, in the aerospace industry, in addition to government regulations, quality control procedures must follow the AS9100 system to comply with the industry standard. In particular, compliance with applicable rules generally requires a part manufacturing process to produce parts with characteristics, or features, that satisfy a set of requirements set down in a specification. The specification includes a nominal, or a target value, for the features. As producing a feature dimensioned precisely to the nominal value is statistically unlikely, the specification also includes a manufacturing tolerance, which is a range of acceptable variations from the nominal. The smallest value within the tolerance is called a lower specification limit. The highest value within the tolerance is called an upper specification limit. The ability of a manufacturing process to produce part features that are within the specification is referred to as the capability of the process.

Controlling process capability may not be sufficient to ensure usability of manufactured parts. Depending on a part, features of the part may gravitate towards the upper specification limit or the lower specification limit. For example, if a part includes a hole, the features of the part associated with the hole tend to be produced closer to the lower specification limit, which allows for the hole to be enlarged if necessary. On the other hand, if a part includes a concave surface, production of features of the part associated with the surface may gravitate towards the upper specification limit, which allows for the surface of the part to be reduced if necessary. As a result, the manufacturing processes may produce mating parts that are both within tolerance, but which are incompatible with each other. As a number of interacting parts grows, the problems caused by these incompatibilities accumulate. For example, aerospace parts manufacturing involves complex supply chains with large number of suppliers, small quantities of parts produced, and high requirements for precision in parts manufacturing. Building a commercial airplane may require on the order of 650,000 parts, and involve on the order of 20,000 people manufacturing the parts. As each part has on average ten features, there are 6,500,000 potential areas of conflict involved in putting the parts together to make the airplane. The incompatibilities between the parts require the parts to be either modified or replaced, increasing the cost and the time required to produce the airplane.

The situation is further exacerbated due to a lack of an easy way to see whether a particular parts manufacturer produces particular features of parts close to the nominal, or whether these features gravitate towards upper or lower specification limits. As a result, when a customer needs particular mating parts, the customer has no easy way of knowing whether the parts produced by different manufacturers will be compatible with each other.

Current technology is not sufficient to effectively address these challenges. For example, statistical process control ("SPC") is a quality control method that uses statistical techniques to identify a cause for variation among part features produced using the same process. SPC involves periodically sampling of part features being manufactured, and calculating a mean of the measured samples. SPC further uses a control chart to visualize the variation among the parts. The mean is set as a centerline on the chart and three standard deviations away from the mean are shown as upper and lower control limits. While certain variation in output is inherent in any manufacturing process, SPC assumes that special causes for variation, such as a malfunction in a production machinery, exist when certain sampling patterns occur, such as a sampling point falling outside the upper or the lower control limits on the chart. The identification of the special variation allows the parts manufacturer to remove the cause for variation, and ideally, to control the manufacturing process. Thus, SPC allows to keep dimensions of features of parts within a certain distance from the mean, without bringing the features of the manufactured parts closer to the nominal. Furthermore, SPC is only effective when there is a small number of variables involved, and as the number of variables increases, the identification of the cause for the special variation can become impracticably difficult. Thus, in industries such as the aerospace industry, where there is a large number of variables involved in parts manufacturing and where outsourcing of part manufacturing and creation of vast supplies chains are common, the effectiveness of SPC is even more limited.

Therefore, there is a need for an efficient way to organize and present data regarding how close to the nominal are part features produced under certain circumstances.

SUMMARY

The system and method described below allow to visualize how close to the nominal are features produced under different sets of circumstances, such as by different manufacturers, operators, or different machines. Measurements for the features are obtained and assigned into one of capability zones based on how close the measurements are to the nominal. The capability zones are visualized in a way that allows easily distinguishing between the zones, such by representing the zones with different colors, and assessing the number of measurements in each of the zones, such as by representing each of the zones with a bar in a bar graph. Any technical problems associated with the production of the features measured can also be displayed and a solution to the problem can be recommended. By seeing in real time the technical or other manufacturing problems responsible for the non-conformant outliers, features that are either out of tolerance or deviate significantly from the nominal, a part manufacturer can correct these problems, and by removing the outliers can increase the overall capability of a manufacturing process as well as produce features that are closer to the nominal. Furthermore, a capability score can be calculated based on measurements produced under different sets of circumstances, such as by different manufacturers, allowing an easy comparison of how close to the nominal are features produced under different sets of circumstances. When multiple manufacturers can produce the same part feature, the ability to compare how close to the nominal the feature tends to be when produced by the manufacturer allows a user to select manufacturers best suited to produce the feature.

Similarly, manufacturing part features that are close to the nominal allows to achieve an improved fit between mating parts and even the rate at which the parts wear out. Furthermore, the improved fit between the parts decreases the likelihood that one of the parts will need to be replaced during an assembly of a final product such as an airplane, decreases the time necessary to assemble the parts together, and decreases the cost of the assembly.

In one embodiment, a computer-implemented system and method for capability zone-based manufacturing quality control are provided. A specification for manufacturing a part feature is obtained, the specification including a nominal and a tolerance. A plurality of measurements for the feature are obtained. A difference is determined between the nominal and each of the measurements. The difference for each of the measurements is compared to the tolerance. Each of the measurements is assigned into one of a plurality of capability zones of measurements based on the comparison. Visual representations of the capability zones into which the measurements were assigned are output.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 7 is a screenshot of the user interface of FIG. 1 showing a listing of measurements falling into a capability zone selected by a user in accordance with one embodiment.

FIG. 11 is a screenshot of the user interface of FIG. 1 showing a surface profile report of measurements taken for a surface profile characteristic of a part in accordance with one embodiment.

FIG. 12 is a screenshot of the user interface of FIG. 1 showing a surface profile process map for a selected surface profile characteristic in accordance with one embodiment.

DETAILED DESCRIPTION

Instead of treating all features of manufactured parts that are within tolerance as equally acceptable, some have recognized that minimizing deviation of features from target values can increase the quality of the parts with features. For example, the principles of Dr. Genichi Taguchi's Quality Engineering, also known as Taguchi Methods, aim to have the features of manufactured parts to have a minimal, if any, deviation from the nominal. The reduction of the deviation can be accomplished by identifying where in relation to the nominal the measured values of manufactured features fall, presenting these results to a user in a simple and efficient manner, and recommending to the user how the user can make improvements to the manufacturing process used to make the features. In addition, the improvements can increase the overall capability of the manufacturing process.

While the description below makes references to applications in aerospace manufacturing, the system and method described below can be applied in any other industries. For example, the system and method can be applied in medical equipment manufacturing.

System

Figure 1:
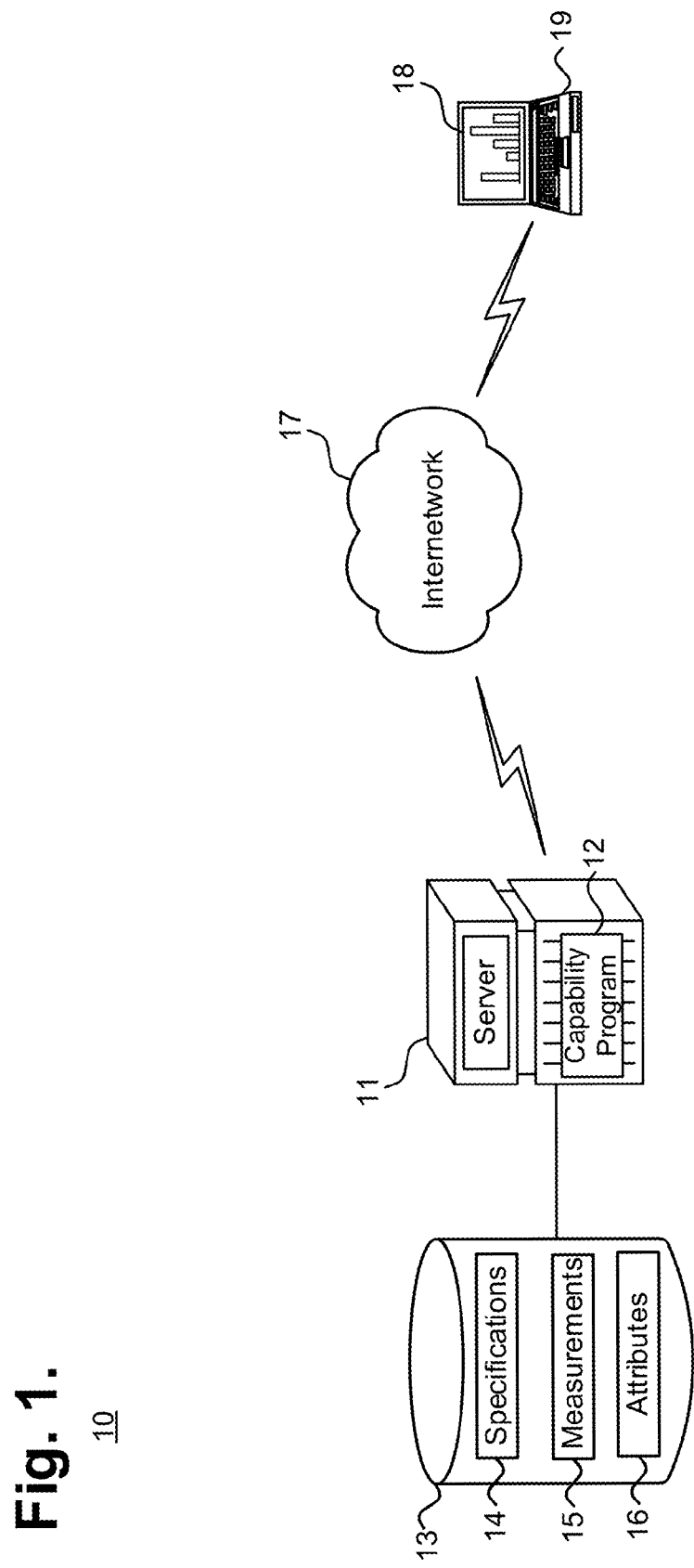
FIG. 1 is a block diagram showing a computer-implemented system for capability zone-based manufacturing quality control in accordance with one embodiment.

FIG. 1 is a block diagram showing a computer-implemented system 10 for capability zone-based manufacturing quality control in accordance with one embodiment. The system includes one or more servers 11 that execute a capability program 12, which, as described below, evaluates where in relation to the nominal are manufactured features. The servers 11 are connected to at least one database 13 that stores specifications 14 for features of one or more parts. Each feature is characteristic of a part defined by the specification 14. For example, a feature of a part can be a diameter, a radius, or a linear dimension of a part. A part can be any component of a composite article, such as an airplane, and can include multiple features. The specification 14 for every feature includes a nominal for the feature, which is the target value for the feature. The specification 14 further includes a tolerance, a range of values within which the feature is permitted to deviate from the nominal. In one embodiment, the specification 14 can be extracted from a drawing of a part by a scanner (not shown) accessible to the server 11. In a further embodiment, the specification 14 can be extracted from a three-dimensional model of a part by a three-dimensional scanner connected to the servers 11. Other sources from which the specification can be obtained are possible. For example, the specification 14 can be obtained by the servers 11 from a third party.

The system 10 also includes multiple measurements 15 for the features described by the specification. The same specification 14 is generally used to manufacture a feature multiple times, such as when multiple parts with features made according to the same specification 14 are required. By measuring a feature manufactured according to a specification 14 on multiple parts with that feature, multiple measurements 15 for the same feature can be taken. Furthermore, when a feature is a characteristic of a surface of a part, such as flatness of a particular part surface, the feature can be measured at multiple points of the surface of the same part, and multiple measurements 15 can be obtained for a feature based on the same part, as further described below with reference to FIGS. 12, 13, and 14. These measurements 15 can be obtained by the servers 11 from the manufacturers of the features, or other third parties, and stored in the database 13.

Each measurement 15 includes a value for the measured feature and is also associated with attributes 16, which are also stored in the database 13. Each attribute 16 is a circumstance relating to how the measurement was taken or the production of the feature that was measured. Attributes 16 can include an identification of the feature measured, a manufacturer who produced the feature, a date when the measurement or the feature were made, a machine on which the feature was produced or tools used for the production, an operator who produced the feature, a manufacturing process used to process the feature, a part number of the part associated with the feature, and the shift during which the feature was made. The attributes 16 can further include the composite article, such as an airplane, for which the part to which the feature belongs is intended, such as the airplane for which the part is intended. The attributes 16 can also include causes of feature nonconformance, technical or other kinds of problems recorded during the production of a feature that was measured, which can be received by the servers from the manufacturer of the feature in question. A feature is non-conformant when the feature is out of tolerance or deviates from the nominal beyond a predefined limit. Still other attributes are possible.

The database 13 can further store corrective actions for fixing the problems (not shown). The corrective actions can be preloaded into the database 13 or received from technical specialists working for a manufacturer along with the identified technical problems. If the corrective actions are preloaded, the actions can be matched to the problem received, and presented to a user together. If the suggested corrective action originally came with the identified problem, the action can also be presented to the user. Other data can also be stored in the database 13.

In one embodiment, the one or more servers 11 and the database 13 can be a part of a cloud-computing environment (not shown). For example, the client-computing environment can be maintained by ViaWest, Inc. of Denver, Colo., though other providers of cloud-computing services can also be used. In a further embodiment, the servers 11 connected to the database 13 can be dedicated servers 11.

The one or more servers 11 can include components conventionally found in general purpose programmable computing devices, such as a central processing unit, memory, input/output ports, network interfaces, and non-volatile storage, although other components are possible. The central processing unit can implement computer-executable code, such as the capability program 12, which can be implemented as modules. The modules can be implemented as a computer program or procedure written as source code in a conventional programming language and presented for execution by the central processing unit as object or byte code. Alternatively, the modules could also be implemented in hardware, either as integrated circuitry or burned into read-only memory components, and the servers 11 can act as specialized computers. For instance, when the modules are implemented as hardware, that particular hardware is specialized to perform the operations described above and below, and other computing devices cannot be used for that purpose. Additionally, when the modules are burned into read-only memory components, the servers 11 storing the read-only memory becomes specialized to perform the operations described above and below that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

The capability program 12 assigns the measurements 15 for a feature into one of a multitude of capability zones. Each of the capability zones is a collection of measurements 15 that are within a certain interval, or multiple intervals, of values, from the nominal. The intervals of values can be expressed in relation to the tolerance for the feature defined in the specification 14. For example, the interval of values can be expressed as a percentage of the tolerance. From this point on in this application, the term Universal Measuring Index ("UMI") is used interchangeably with the term "percent of the tolerance from the nominal"; for example, the phrase UMI of 19 would mean 19% of the tolerance from the nominal.

Other ways to express the intervals of values in relation to the tolerance are possible. For instance, the intervals can be expressed as a decimal or a simple fraction of the tolerance. Still other ways to express the intervals of values are possible.

Table 1 below presents a list of intervals of values, expressed as percentage of the tolerance, from the nominal into which a measurement 15 must fall to be assigned to one of the zones. For example, the 6 Sigma zone includes measurements 15 that are between 0% (at the nominal) and 16.2580% of the tolerance away from the nominal, which includes measurements 15 whose value is up to 16.2580% higher than the nominal and measurements 15 whose value is up to 16.2580% lower than from the nominal. Thus, each of the zones covers two intervals of values: an interval that includes values greater than the nominal and an interval that includes values lower than the nominal. In a further embodiment, not shown in Table 1, each zone can include only one interval of values, which is either greater or lower than the nominal, with the number of zones being increased to cover all of the intervals.

Each of the capability zones is also associated with a certain capability of the manufacturing process that produced the measurements 15 that fall into the zone. Previously, a capability of a manufacturing process has been expressed in terms of several metrics. One of the metrics is a maximum number of defects, features that are out of tolerance, per million of part features produced by the process at a certain capability level. The maximum number of defects can also be expressed as a percentage of defective features produced. Another way to express process capability is using the Process Capability Index, $C_{pk}$, a statistical measure of process capability that assumes a normal distribution of the output of the process. The index is calculated by taking the minimum of: a) the mean of the measurements for features produced by a process minus the lower specification limit, with the result divided by three standard deviations of the mean; b) the upper specification limit minus the mean, with the result being divided by three standard deviations. Table 1 presents the data regarding the capability of the processes associated with each of the capability zones expressed as a maximum defect rate per million of the process, the maximum percentage rate of the defects for the process, and the $C_{pk}$ of the process.

Certain levels of process capability have also been expressed in what is known as Sigma Levels, with each Sigma Level corresponding to a certain maximum defect rate per million, the percentage defect rate, and the $C_{pk}$. Except for the zone named "Out of Tolerance," the capability of a process that produces features with measurements 15 that fall into one of the capability zones corresponds to one of the Sigma Levels. Accordingly, in the embodiment shown with reference to Table 1, the names of the zones reflect the Sigma Level of capability with which the zone is associated. For example, the 6 Sigma zone is associated with a process whose capability is at the 6 Sigma Level capability: the process produces a maximum 3.4 defects per million of part features manufactured and has a $C_{pk}$ of 2.000. Other names for the capability zones are possible.

TABLE 1

| % Tolerance from Nominal | Zone name | Range | Defect rate per million | % defect rate | $C_{pk}$ |
|---|---|---|---|---|---|
| 0% to 16.2580% | 6 Sigma | −16.2580% to 0% and 0% to 16.2580% | 3.4 | 0.00% | 2.000 |
| 16.2581% to 19.5046% | 5 Sigma | −19.5046% to −16.2581% and 16.2581% to 19.5046% | 230 | 0.02% | 1.667 |
| 19.5047% to 24.3690% | 4 Sigma | −24.3690% to −19.5047% and 19.5047% to 24.3690% | 6,200 | .62% | 1.33 |
| 24.3691% to 32.5000% | 3 Sigma | −32.5000% to −24.3691% and 24.3691% to 32.5000% | 66,800 | 6.68% | 1.000 |
| 32.5001% to 48.5000% | 2 Sigma | −48.5000% to −32.5001% and 32.5001% to 48.5000% | 308,500 | 30.85% | .667 |
| 48.5001% to 100.000% | 1 Sigma | −100.000% to −48.5001% and 48.5001% to 100.000% | 691,500 | 69.15% | .333 |
| >100.000% | Out of Tolerance | <−100.000% and >100.000% | >691,500 | >69.15% | <.333 |

Figure 15:
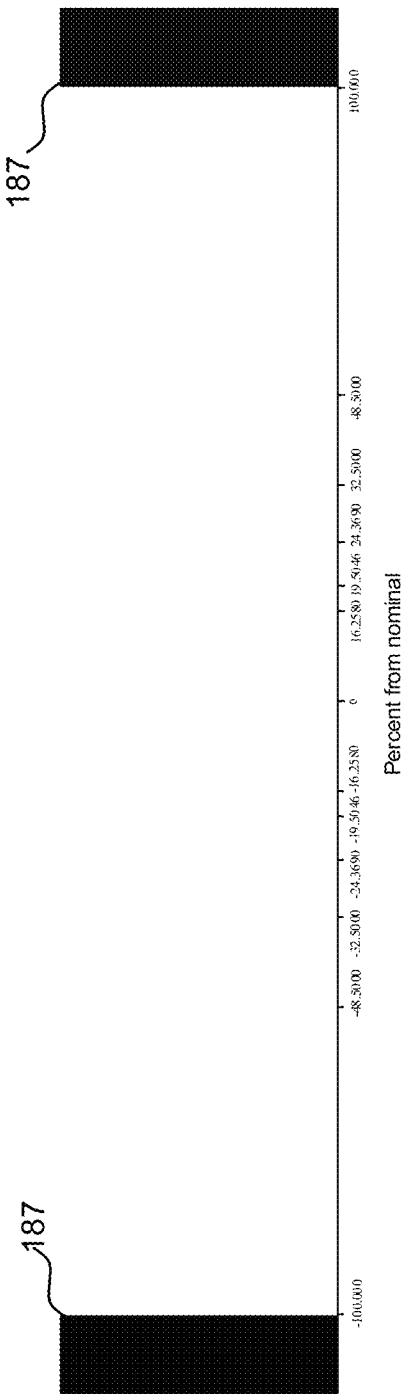
FIGS. 15A-15G show a graph illustrating the ranges of measurements falling into each of the capability zones in accordance with one embodiment.

As mentioned above and as seen in the "Range" column of Table 1, each of the capability zones can include measurements falling above and below the nominal. FIGS. 15A-15G show a graph 180 illustrating the ranges of measurements falling into each of the capability zones in accordance with one embodiment. The y-axis of the graph 180 shows the percentage of the tolerance by which measurements deviate from the nominal. The bars on the graph represent measurements falling into each of the capability zones. As illustrated by FIG. 15A, the 6 Sigma zone 181 includes measurements that fall between −16.2580% and 16.2580% away from the nominal, including the measurements that are at the nominal (0% away from the nominal). As illustrated by FIG. 15B, the 5 Sigma zone 182 includes measurements that fall between −19.5046% to −16.2581% and between 16.2581% to 19.5046% from the nominal. As illustrated by FIG. 15C, the 4 Sigma zone 183 includes measurements that fall between −24.3690% to −19.5047% and between 19.5047% to 24.3690% from the nominal. As illustrated by FIG. 15D, the 3 Sigma zone 184 includes measurements that fall between −32.5000% to −24.3691% and between 24.3691% to 32.5000% away from the nominal. As illustrated by FIG. 15E, the 2 Sigma Zone 185 includes measurements that fall between −48.5000% to −32.5001% and between 32.5001% to 48.5000% away from the nominal. As seen in FIG. 15F, the 1 Sigma zone 186 includes measurements that fall between −100.000% to −48.5001% and between 48.5001% to 100.000%. Finally, as seen in FIG. 15G, the out of tolerance zone 187 includes measurements that <−100.000% and >100.000% away from the nominal.

Returning to FIG. 1, after assigning the measurements 15 into one of the capability zones 15, the capability program 12 calculates one or more capability scores, shown below beginning with reference to FIG. 5, based on the capability zones into which the measurements are assigned as well as other factors, as described in detail below beginning with reference to FIG. 2. A capability score for an attribute 16 or attributes 16 selected by a user, shows how close to the nominal, on average, are measurements 15 associated with the selected attribute 16 or attributes 16. In one embodiment, a maximum capability score is 100, which indicates that all the measurements 15 for an attribute 16 that have been accounted for are in the 6 Sigma zone. The minimum score, indicating that a significant number of measurements 15 associated with the attributes 16 are in the Out of Tolerance zone, can be set as zero. In a further embodiment, other maximum and minimum scores can be set. The calculated capability scores can be stored in the database 13 or in other storage mediums.

The use of capability scores allows comparison of attributes 16 in the same category, such as multiple manufacturers to each other. For example, capability scores can be calculated for two manufacturers producing the same part feature, with the capability scores showing how close to the nominal, on average, the feature is when produced by the manufacturers. By comparing the capability scores, a user can select between the two manufacturers best-suited to produce the feature.

The servers 11 are connected to an internetwork 17, such as the Internet. Through the internetwork 17, the servers 11 output the distribution of measurements into the capability zones and capability scores to a user via a user interface 18 presented on one or more user devices 18. As further described beginning with reference to FIG. 5, the user interface 18 allows a user to select attributes, such as a particular manufacturer and a particular feature, and displays distribution of measurements into the capability zones and a capability score for the selected attributes. Other ways in which the user interface 18 can display the results generated by the capability program are described below. Still other information can be displayed by the user interface 18.

In one embodiment, the user interface 18 can be accessed through an Internet browser running on the user device 19, such as by presenting the user interface 18 on a webpage maintained by the servers 11. In a further embodiment, the user interface 18 can be accessed through a mobile application running on the user device 19. Still other ways of accessing the user interface 18 are possible. While the user device 19 is shown as a laptop computer, the user devices 18 can also include desktop computers, smartphones, media players, tablets, and other devices capable of establishing a connection to the Internetwork 17. Still other kinds of user devices 18 are possible. Furthermore, through the user devices 18, users, such as part manufacturers, can submit measurements 15, associated attributes, and other associated information, such as corrective actions for the problems, into the system 10.

Method

Figure 2:
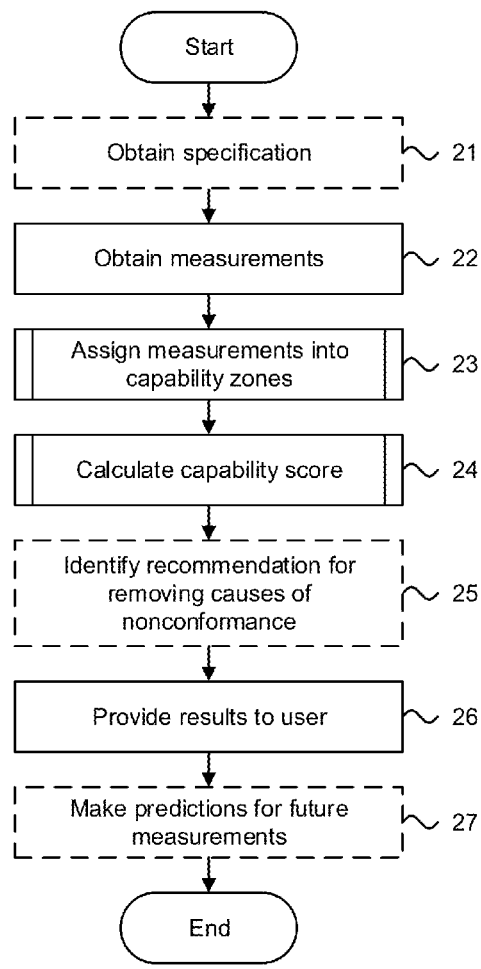
FIG. 2 is a flow diagram showing a computer-implemented method for capability zone-based manufacturing quality control in accordance with one embodiment.

FIG. 2 is a flow diagram showing a computer-implemented method 20 for capability zone-based manufacturing quality control in accordance with one embodiment. The method 20 can be implemented using the system 10 of FIG. 1, though other implementations are also possible. Optionally, if not previously available, a specification for one or more features is obtained at least one server, such as the one or more servers 11 described above with reference to FIG. 1 (step 21). The specifications can be received from a third party, scanned from a drawing or a three-dimensional model, or obtained in other ways.

Measurements for one or more of the features and data associated with the measurements, such as the attributes, are also obtained by the server (step 22). For example, the measurements can be entered into the system through the user interface running on the user devices in possession of the manufacturers that made the measurements. Other ways to obtain the measurements are possible. The associated data can also include information other than the attributes, such as recommendations for fixing technical or other problems recorded during feature production. The measurements for one feature can be made on multiple parts that have that feature, and if a feature is a surface characteristic, multiple measurements can also be taken on multiple points of a surface of the same part.

Figure 3:
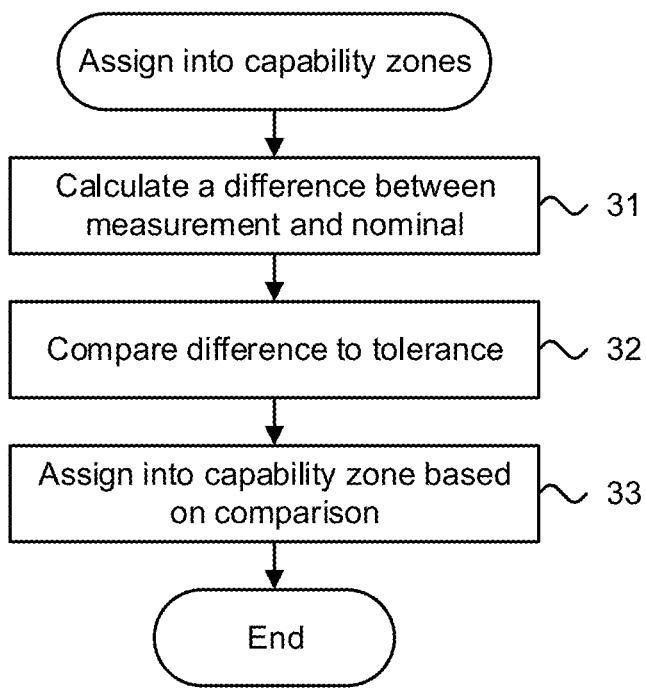
FIG. 3 is a flow diagram showing a routine for assigning a measurement for a feature into a capability zone for use in the method of FIG. 2 in accordance with one embodiment.

Once the measurements are obtained, the server compares the measurements for each of the features to the specification for the features and assigns the measurements into the capability zones described above with reference to Table 1 (step 23), as further described with reference to FIG. 3. Based on the assignments, one or more capability scores are calculated by the server for one or more attributes of the measurements (step 24), as further described with reference to FIG. 4.

Optionally, if technical or other kinds of problems that are causes of non-conformance have been obtained with the measurements and a proposed corrective action has not been submitted with the recorded problems, the server matches the causes with a recommended corrective actions for the problems (step 25). The results of the assignments into the capability scores, the capability scores, and problems together with recommendations for fixing these problems are provided by the server to the user through the user interface (step 26), as further described below beginning with reference to FIG. 5.

Optionally, a prediction for measurements made for a feature produced in the future can be made by the server (step 27), terminating the method 20. The prediction can also be made at another point of the method 20. The prediction is made by choosing an initial value, such as based on theoretical formulas for what a manufacturing process under certain conditions can produce, and modifying the value based on how close to the predicted value are actual measurements for the feature produced by the process.

Assigning the measurements into the capability zones provides a way to visualize how close all of the measurements associated with particular attributes are to the nominal. FIG. 3 is a flow diagram showing a routine 30 for assigning a measurement for a feature into a capability zone for use in the method 20 of FIG. 2 in accordance with one embodiment. Initially, a difference is calculated between the nominal in the specification for the feature and the measurement of the feature (step 31). For example, if a specification for a feature includes a nominal of 0.100 cm with a tolerance of +/−0.010 cm, and a measurement for a feature is 0.102 cm, the difference between the nominal and the measurement is 0.002 cm.

Once calculated, the difference is compared to the tolerance for the feature listed in the specification (step 32). The comparison can include dividing the difference by the tolerance and multiplying the result by 100% to obtain a percentage of the tolerance that the measurement is away from the nominal. Continuing with the above example, the difference of 0.002 cm is divided by the tolerance of 0.010 and multiplied by 100%, obtaining the result that the measurement is 20% of the tolerance away from the nominal. Other ways to express the result of the comparison are possible. For example, the difference can be identified as a simple or a decimal fraction of the tolerance.

Based on the results of the comparison, the measurement is assigned into one of the capability zones described above with reference to Table 1 (step 33), completing the routine 30. Continuing with the above example, as the measurement is 20% of the tolerance away from the nominal, the measurement is assigned into the 4 Sigma capability zone, which includes measurements that are 19.5047% to 24.3690% away from the nominal.

Figure 4:
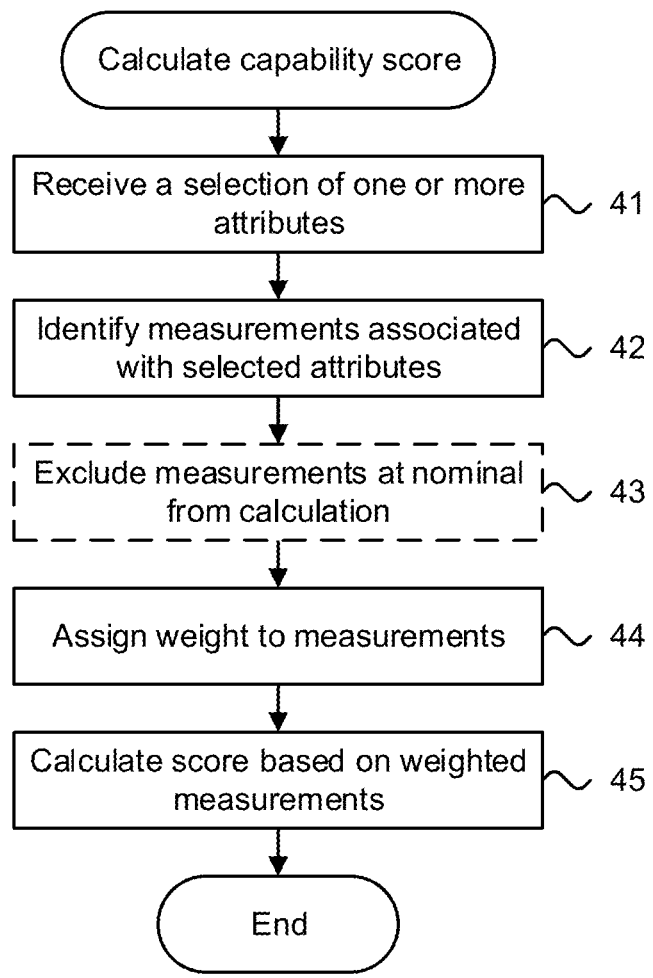
FIG. 4 is a flow diagram showing a routine for calculating a capability score for use in the method of FIG. 2 in accordance with one embodiment.

A capability score indicates how close, on average, measurements associated with particular attributes are to the nominal, and provides an easy way to compare and rank attributes within the same category. FIG. 4 is a flow diagram showing a routine 40 for calculating a capability score for use in the method 20 of FIG. 2 in accordance with one embodiment. Initially, a selection of one or more attributes is received from a user (step 41). For example, a user can select a particular manufacturer, a feature produced by that manufacturer, and an operator working for the manufacturer who produced the feature. Other attributes can be selected. Once the selection is received, measurements associated with all of the selected attributes are identified in the database storing the measurements, such as the database of FIG. 1 (step 42). For example, if three attributes are selected, only those of the measurements that are associated with all three of the selected attributes are identified.

As measurements are statistically unlikely to be precisely at the nominal, part or all of the identified measurements falling precisely at the nominal can optionally be excluded from subsequent calculations of the capability score due to a possibility that these measurements have been fabricated (step 43). For example, in one embodiment, 90% of identified measurements that are at the nominal may be excluded from the calculations. In a further embodiment, another percentage of the measurements at the nominal can be excluded. In a still further embodiment, other kinds of measurements can also be excluded.

Once identified, the non-excluded measurements are weighed based on one or more factors (step 44). One factor that influences a weight of a measurement is what capability zone the measurement is assigned into. Generally, the further away from the nominal a measurement is, the more the capability score will be affected by the measurement. The examples of weights provided below are given for illustrative purposes and other kinds of weights can also be given to the measurements.

Measurements that fall into the 6 Sigma zone are associated with a low defect rate and are given a weight of zero; these measurements do not count against the capability score during the calculation of the score. Measurements that fall into the 5 Sigma zone are given a weight of 1.25, measurements in the 4 Sigma zone are given the weight of 2.5, and measurements in the 3 Sigma are given the weight of 6. The weight of a measurements in the 5, 4, and 3 Sigma zones can further be adjusted based on the location of a measurement within the zone; for example, a measurement that is 19.5 UMI can be given a greater weight than a measurement at 17 UMI. Measurements that fall into the 2 Sigma zone are given a weight of 9.5 and measurements that are in the 1 Sigma zone are given the weight of 14; the weighing of the measurements in these two zones is higher to reflect that processes producing these measurements are "out-of-control," there is a source of special variation in these processes. Finally, measurements that are out of tolerance are given the weight of 20, with the weight of measurement capable of being further adjusted based on the location within the zone up to a maximum UMI of +/−200, with measurements beyond UMI of +/−200 having the same weight as measurements of at +/−200 UMI.

In addition to being weighted based on the capability zones, the measurements can also be weighed on their age, how long ago the measurements were taken. The weight of the measurements is decreased linearly, down to a minimum of weight of 0, which is reached at the age of five years. Thus, measurements are given a score of 0 at five years. The weight of a measurement is halved when the measurement is 2.5 years.

In addition to being weighted based on the capability zones, the measurements can be further weighed based on how likely the measurement are to be accurate. For example, a measurement is statistically unlikely to have two trailing zeros, two zeros as last digits; such a measurement is likely to be due to a malfunction of the measuring instrument. Therefore, the weight of the measurement with two trailing zeros can be decreased.

Finally, in addition to being weighed based on the capability zones, if a prediction was made for a measurement based on past data, the weight of the measurements can be lowered if the measurements differs from the prediction by greater than a predefined limit. Still other ways to weigh the measurements are possible.

After the measurements are weighed, a capability score is calculated based on the weights (step 45), completing the routine 40. As mentioned above, in one embodiment, the capability score can vary between 0 and 100, though other values are also possible. One way to calculate the score between 0 and 100 based on weighted measurements is presented below. The example is provided for illustrative purposes only; other ways to obtain the score are possible.

Initially, the percentage of measurements with a certain weight among a total number of measurements for selected attributes is calculated. For example, if out of 10,000 total measurements, 9,000 were in the Out of Tolerance zone, with a weight of 20, and 1000 were in the 1 Sigma zone, with a weight of 14, there would be 90% of the measurements with the weight of 20 and 10% of the measurements with the weight of 14. The weights are subsequently multiplied the corresponding percentage converted to a decimal fraction. Continuing with the previous example, 14 is multiplied by 0.1 to obtain 1.4 and 20 is multiplied by 0.9 to obtain 18. The results of the multiplication are in turn multiplied by 5. All of the results of the multiplication by 5 are subtracted from 100 to obtain the score. In the above example, subtracting the results of the multiplication by 5 from 100 results in a capability score of 3. Other ways to calculate the score are possible.

User Interface

The user interface of the system of FIG. 1 provides a way to visualize the distribution of measurements into the capability zones, compare attributes based on capability scores, and identify to the user manufacturing problems and proposed corrective actions that can increase prevent further outliers from being produced. FIG. 5 is a screen shot of the user interface of FIG. 1 presenting a report 50 of assignments of measurements into capability zones in accordance with one embodiment. The interface includes an information input area 51, which can be used to select attributes for which the distribution of measurements into the capability zones can be shown and the capability score 52 can be calculated. The calculated capability score 52 can be displayed below the information input area 51; in a further embodiment, the score 52 can be displayed on another portion of the user interface. The distribution of the measurements can be shown in the capability zone display 53.

The report 50 as shown shows the distribution of measurements and the capability score based on a single selected attribute: a manufacturer 54. As no other attributes are selected, all of the measurements for the manufacturer 54 are represented in the distribution and used for the calculation of the score 52. Through the information input area 51, the user can select one or more other attributes; measurements that are associated with all of the selected attributes are identified and the capability score 52 and the measurement distribution are generated based on these measurements in the display 53. For example, the user can also select a particular feature 55 produced by the manufacturer 54, which will show the distribution and calculate the score 52 for all measurements of that feature 54 produced by the manufacturer 55. The user can also other select attributes or combinations of attributes, with the distribution shown in the display 53 and the calculation of the score 52 being based on the selection. A user can also select other attributes such as a particular operator 57, part 58, material 59, machine 60, tool 61, or process 62 for which the capability score 52 is calculated. For example, the user can select out of all operators 57 working for the manufacturer 54. Alternatively, a user can choose out of all of the operators 57 regardless of the manufacturers 54 for which they work.

If there are multiple attributes available in the same category, such multiple manufacturers 54 shown under the same selection tab, the attributes can be ranked based on their capability scores 52, with the highest-ranked manufacturer having the highest capability score 52. A user can use the arrows 56 to display information about the higher and lower ranked manufacturers 54 on the user interface. The ranking information can further be displayed on a separate screen, as further described below with reference to FIG. 6. Listings for other attributes can also be ranked and presented based on the ranking.

As mentioned above, the distribution of measurements into the capability zones can be presented to the user via the capability zone display 53. The display 53 can present the distribution as a bar graph. The y-axis of the bar graph shows the number of measurements. The x-axis shows the names of the capability zones represented by the bars of the bar graph. In the embodiment shown, two bars are present for each of the capability zones, with one of the bars showing the number of measurements whose value is greater than the nominal that fall into the capability zone and the second bar showing the number of measurements whose value is less than the nominal and that fall into the capability zone. In a further embodiment, only one bar can be shown for each of the capability zones, with the bar including the number of all the measurements in the zone regardless of whether the number of the measurement is greater or less than the nominal.

While the bars for the same capability zone showing the numbers of the measurements whose values are greater than the nominal and whose values are less than the nominal are shown to be on the same side of the x-axis, in a further embodiment, the bars for the same capability zone can be shown on different side of the x-axis. In that embodiment, the y-axis would show the numbers of measurements falling into the capability zones on both sides of the x-axis.

Figure 5:
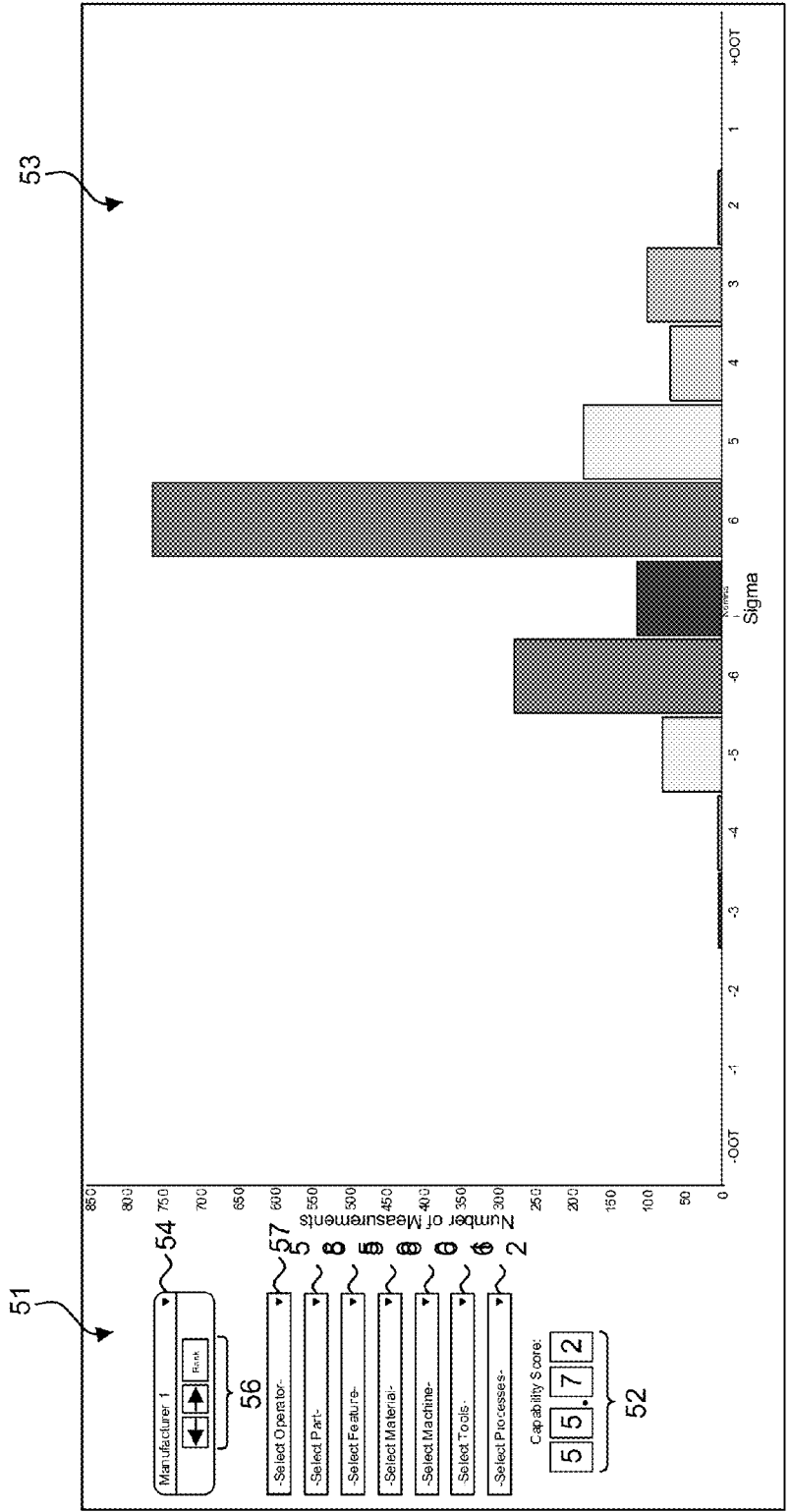
FIG. 5 is a screen shot of the user interface of FIG. 1 presenting a report of assignments of measurements into capability zones in accordance with one embodiment.

While the measurements falling exactly at the nominal are assigned into the 6 Sigma zone, in the embodiment shown with reference to FIG. 5, the number of measurements falling into the nominal is shown separately from the other measurements falling into the 6 Sigma zone. In a further embodiment, the number of measurements falling into the nominal can be combined with one or more bars representing the number of measurements falling into the 6 Sigma zone.

To allow a user to easily distinguish between the capability zones, the bars for each of the capability zones can be shown using different colors, which can include different shades of colors. For example, the bars for the nominal, the 6 Sigma zone, the 5 Sigma zone, and the 4 Sigma zone can be shown using different shades of the color green. The bar for the 3 Sigma zone can be shown as yellow, the bar for the 2 Sigma zone can be shown as orange, and the bar for the 1 Sigma zone can be shown as red. The bar for the Out Of Tolerance zone can be shown as purple. Other colors, color shades, and color schemes can be used to visually represent the capability zones.

Other ways to visually represent the bars in a way that makes them readily distinguishable from each other. For example, in a further embodiment, the bars for each of the capability zones can be given a different shading. Similarly, different patterns can be displayed on the bars for each of the capability zones.

While the embodiment of the user interface shown with reference to FIG. 5 uses a bar graph to represent the numbers of measurements falling into each of the capability zones, other ways to represent the numbers are possible. For example, the numbers can be represented using a pie chart. Still other ways of representing the distribution of measurements are possible.

Figure 6:
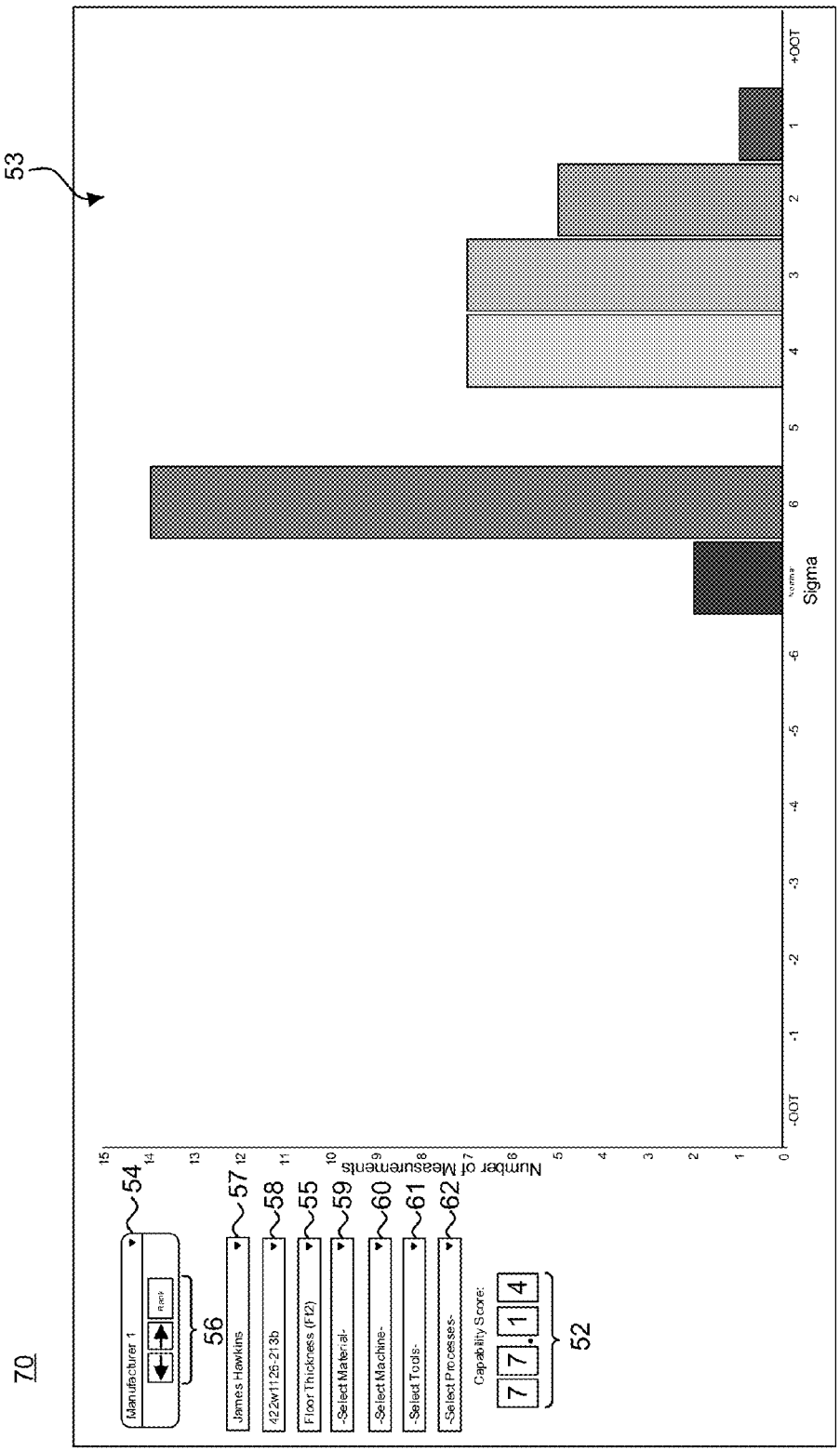
FIG. 6 is a screenshot of the user interface of FIG. 1 showing a report generated based on multiple selected attributes in accordance with one embodiment.

As mentioned above, the capability score can be calculated and the distribution can be shown based on multiple selected attributes. FIG. 6 is a screenshot of the user interface of FIG. 1 showing a report 70 generated based on multiple selected attributes in accordance with one embodiment. The report 70 includes a capability score 52 and a distribution of measurements in the display 53 generated based on multiple selected attributes. In particular, the report 70 shows the score 52 and the distribution of measurements in the capability zone display 53 for a selected feature 55 of a selected part 58 produced by a selected operator 57 working for a selected manufacturer 54. Other combinations of attributes can also be selected.

A user can select one of the bars representing the number of measurements in each of the capability zones in the capability zone display of FIGS. 5 and 6, such as by clicking on the bar with a mouse, and receive a listing of measurements that fall into the capability zone represented by the bar. FIG. 7 is a screenshot of the user interface of FIG. 1 showing a listing 80 of measurements falling into a capability zone selected by a user in accordance with one embodiment. The listing 80 includes the column showing the measurements 81, as well as columns showing attributes associated with each of the measurements, such as the operator 82, the feature 83 for which the measurement is taken, the number of the part 84 for which the measurement is taken, the specification 85 for each of the measurements, the tolerance amount 86 for the measurement above the nominal, the tolerance amount 87 for the measurement above the tolerance, the UMI 88, and the date 89 the measurement was taken. In addition, causes of nonconformance of any of the measurements, such as manufacturing problems, and recommendations for fixing the manufacturing problems can also be displayed in the listing.

A user may obtain a visual representation of each measurement in the listing by selecting the measurement, such as by clicking on the measurement with a mouse. The visual representation can include a bar graph, with the y-axis showing the % tolerance by which the measurement exceeds the nominal (above the origin) or the % tolerance by which the measurement is lower than the lower than the nominal (below the origin). The x-axis can include the name of the feature or another attribute of the measurement. The height of the bar for the measurement represents the % tolerance by which the measurement differs from the nominal. The bar can further be given an appearance, such as a color, of the capability zone into which the measurement falls.

Figure 8:
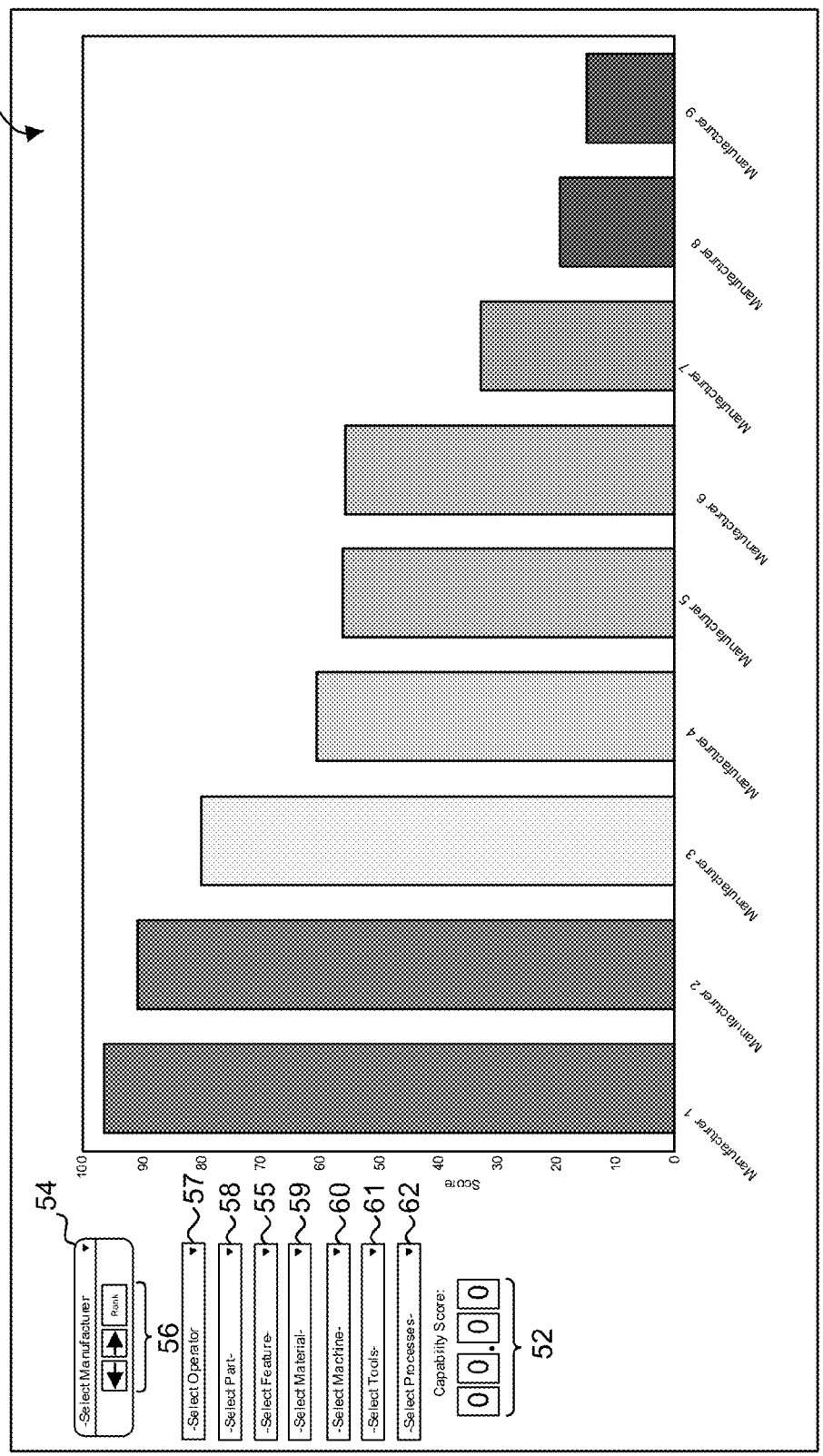
FIG. 8 is a screenshot of the user interface of FIG. 1 showing a ranking of manufacturers in accordance with one embodiment.

As mentioned above, attributes within the same category can be ranked based on their capability scores. FIG. 8 is a screenshot of the user interface of FIG. 1 showing a ranking 90 of manufacturers in accordance with one embodiment. The ranking 90 is displayed in the Capability Charts display 91 using a bar graph, though other ways to display the rankings are possible. The y-axis shows the capability scores from zero to 100. The x-axis shows the names of the manufacturers whose scores are represented by the bars of the bar graph. The height of each of the bars shows the capability score for the manufacturer. The bars can further be visually distinguished from each other, such as by giving each bar a different color or a shade of color, though other ways to visually distinguish the bars are also possible. The color, or other aspect of the visual representation, of the bars for each of the attributes can be the same as the color for the capability zone in which most measurements associated with the attribute are assigned.

Figure 9:
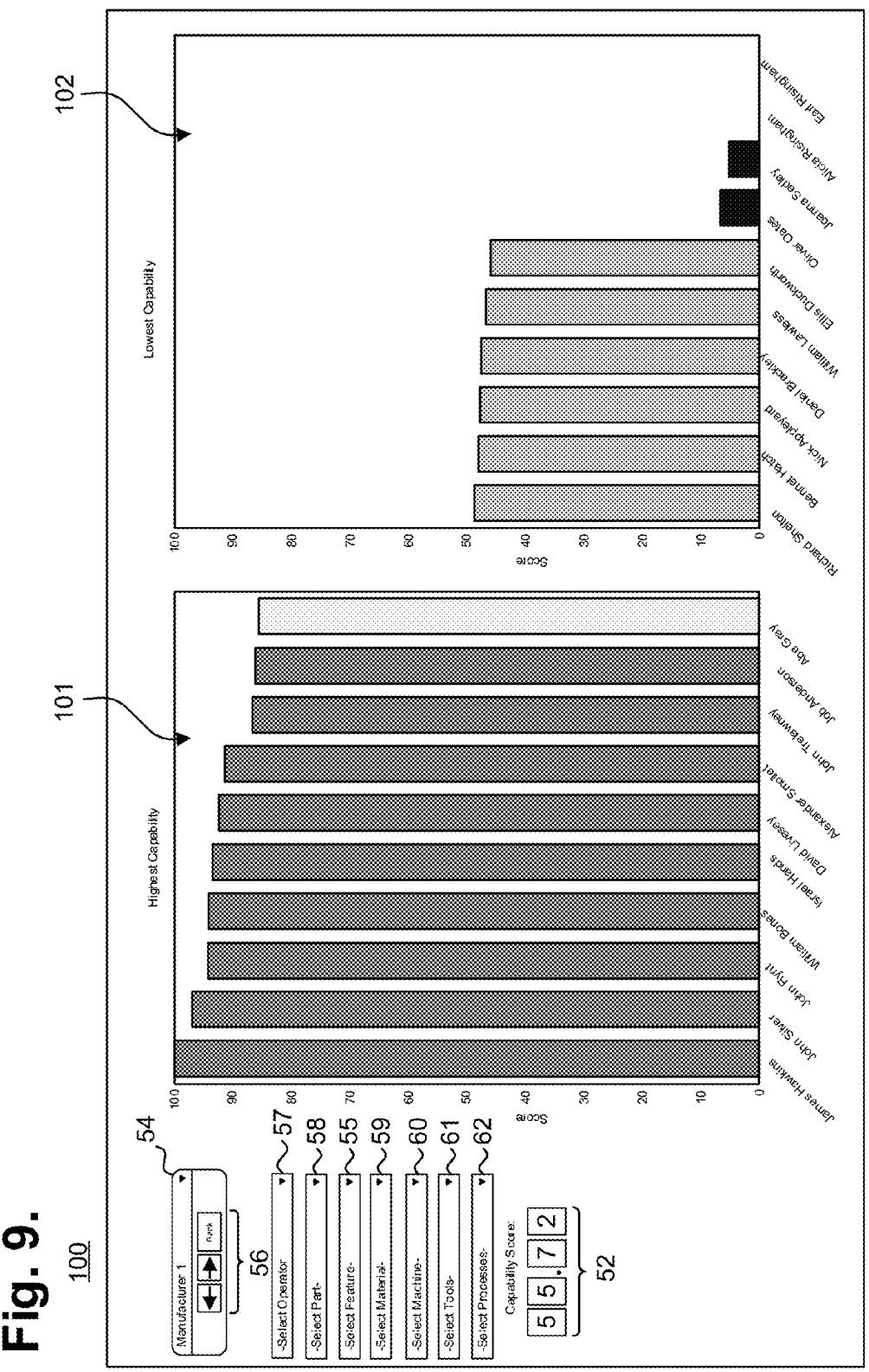
FIG. 9 is a screenshot of the user interface of FIG. 1 showing rankings of highest and lowest ranked operators in accordance with one embodiment.

In addition to displaying all of the rankings together, the user interface can also display only highest and lowest ranked attributes in a category that includes the attributes. FIG. 9 is a screenshot of the user interface of FIG. 1 showing rankings 100 of highest and lowest ranked operators in accordance with one embodiment. The Highest Capability Chart 101 displays ten operators working for a manufacturer with highest capability score while the Lowest Capability Chart 102 displays ten operators working for the manufacturer with lowest capability scores. Other numbers of listings for attributes can also be present in the charts 102, 103. The charts 102, 103 display the operators and the scores using a bar graph. The y-axis of the graphs shows the capability score while the x-axis shows the operators. The height of each of the bars shows the capability score for the operators. The bars can further be visually distinguished from each other, such as by giving each bar a different color or a shade of color, though other ways to visually distinguish the bars are also possible.

Figure 10:
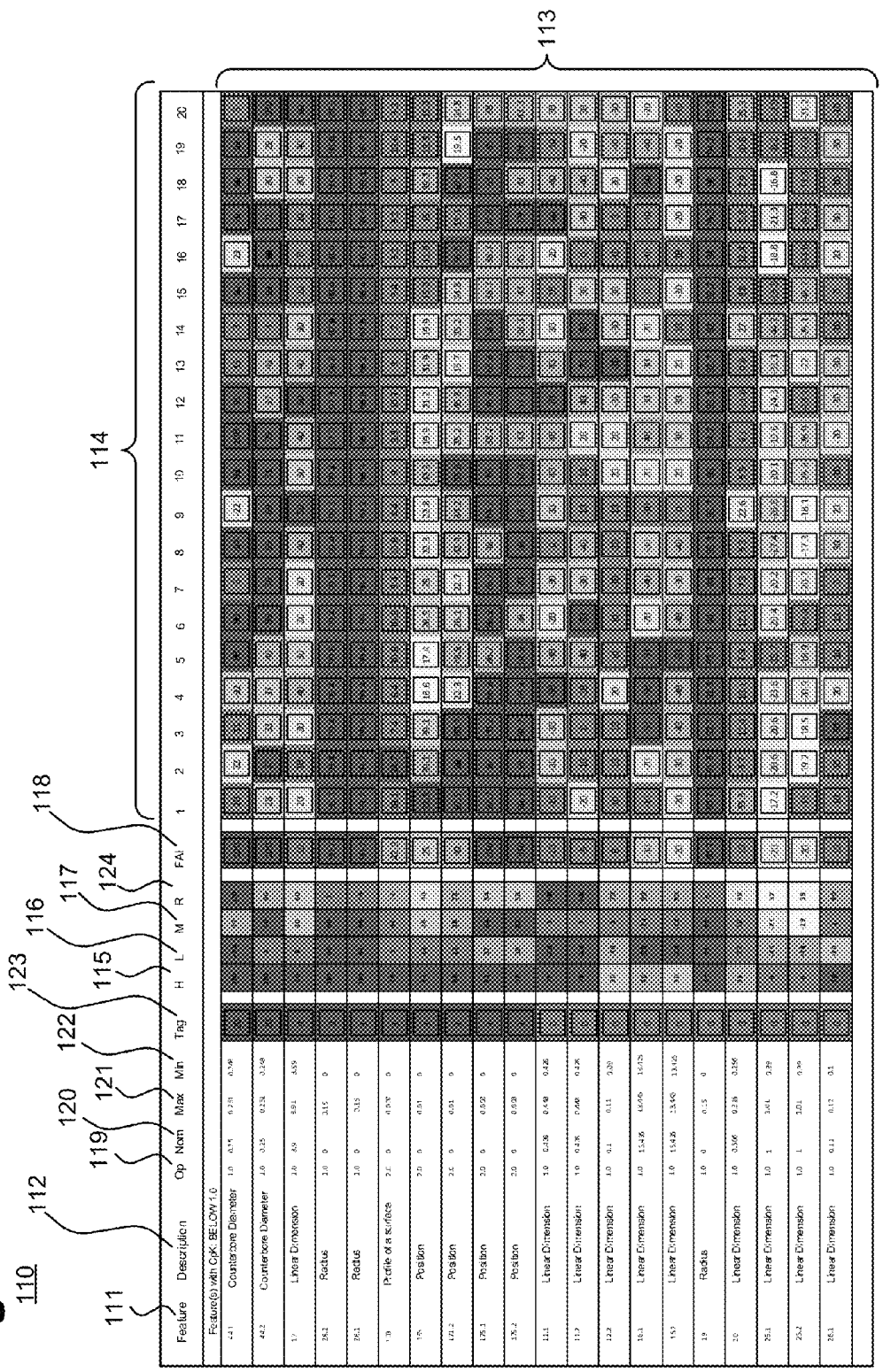
FIG. 10 is a screenshot of the user interface of FIG. 1 showing a quality zone report showing UMIs for most recently taken measurements in accordance with one embodiment.

In addition to providing statistics regarding all of the measurements for selected attributes, the user interface can also present information regarding most recent measurements—measurement taken on features produced during most recent runs of the manufacturing process for which data is available. FIG. 10 is a screenshot of the user interface of FIG. 1 showing a quality zone report 110 showing UMIs for most recently taken measurements in accordance with one embodiment. In one embodiment, the last 20 measurements are shown in the report 110; in a further embodiments, a different number of latest measurements can be displayed. The report 110 includes columns identifying features by a numerical identifier 111 and a text description 112. The UMIs 113 of the measurements for the features are presented in numerical order 114 based on the time when the measurements were taken; in a further embodiment, the numerical order can be based on the time the features were produced if the order is different from the order 114 based on when the measurements were taken.

Each of the UMIs 113 is displayed on a background whose visual appearance, such as color, corresponds to the visual appearance of the capability zone into which the measurement falls. For example, if the bar for the 6 Sigma zone is represented with the color green, such as in the display 53 of FIG. 6, a measurement with a UMI of 10 will be presented on a green background. The use of the number and the color to visually represent each of the measurements allows a user to quickly distinguish between the measurements and understand how close the measurements are to the nominal. A user may also obtain additional information regarding each of the measurements by selecting the displayed UMI, such as by clicking on the UMI with a mouse, which will present to the user one or more attributes of the measurement in addition to the value of the measurement. In one embodiment, the attributes can be presented on a tooltip, though other ways to present the attributes are possible. The presented information can include the CpK of the process used to make the measurement, the name of the operator, and the run number that produced the feature with the measurement. Other attributes, such as any manufacturing problems that are causes for non-conformance that are associated with the measurement can also be presented together with a recommendation for a corrective action to fix the problem. By learning about the manufacturing problems that are associated with the most recent measurements in real time, a user, such a manufacturer, can remedy the problem, improving the capability of the manufacturing process and the quality of the manufactured parts.

The report 110 further includes statistical information for the measurements of the feature, such as the measurement with the highest UMI 115, the measurement with the lowest UMI 116, the mean 117 for the displayed UMIs in that row, and the range 124 the UMIs displayed in that row. Furthermore, the report 110 includes a measurement for each feature obtained during First Article Inspection ("FAI") 118, an inspection of one of a first batch of parts manufactured using a particular process; clicking on the FAI 118 would present to the user a complete report for the FAI 118. In addition, the report includes columns for an identification of a machine on which the feature was produced 119, the nominal 120 for each feature as well as the upper 121 and lower 122 specification limits for each of the features. Finally, the statistics include a column 123 showing a number of measurements that have been tagged as associated with a problem that is a cause for non-conformance for each of the rows.

Figure 11:
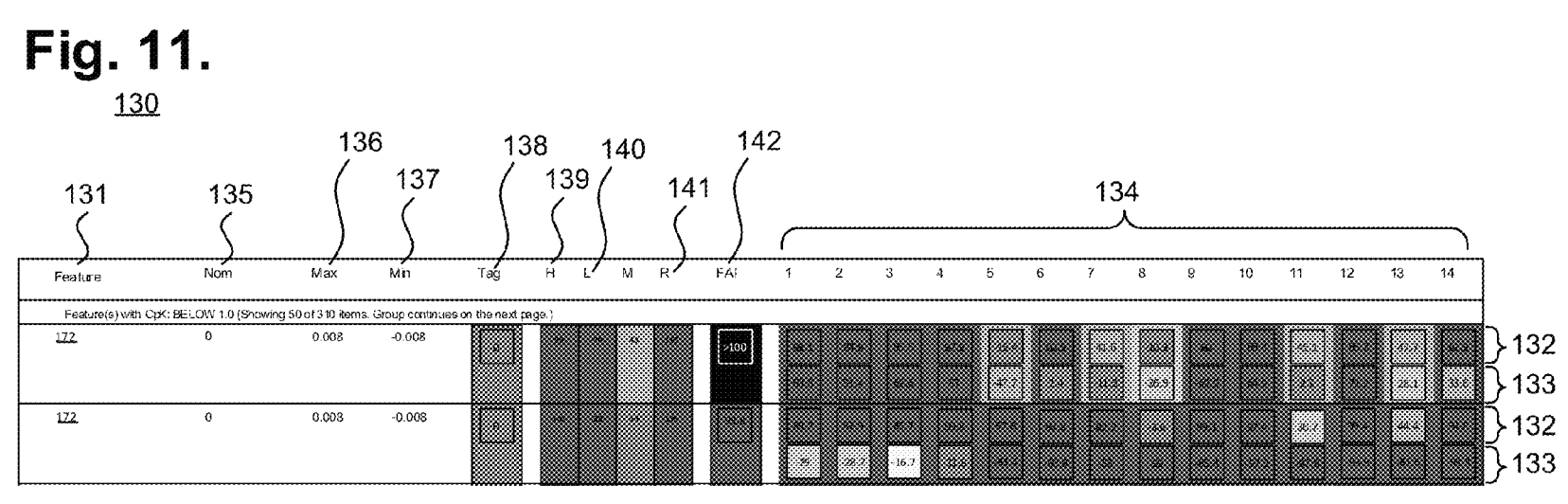

Some features may require multiple measurements at multiple points of the part to ascertain that the features are within the specification. For example, surface profile characteristics of a part, such as flatness of a surface of a part, require measurements of multiple points on the surface to decide if the measurement is within the specification. FIG. 11 is a screenshot of the user interface of FIG. 1 showing a surface profile report 130 of measurements taken for a surface profile characteristics of a part in accordance with one embodiment. The report 130 includes a column 131 identifying the surface profile characteristic, which can include either words, numbers, or both, for which measurements are shown. The report 130 also shows columns the maximum UMI 132 and the minimum UMI 133 of measurements taken on a multiple points of a surface of a part produced during a certain manufacturing run, with the maximum 132 and minimum 133 UMIs being shown in two separate rows. While the numerical order 134 of the measurements shows the UMIs 132, 133 for the last 14 times the surface profile characteristic was measured, measurements for a different number of measurement sets can also be shown. Similarly to FIG. 9, the UMIs for the measurements are displayed on a background whose visual appearance reflects the capability zone that the measurements fall into, such as through the use of the same color as the capability zone is represented with.

The report 130 further includes a column 135 showing the nominal for the surface profile characteristics as well as the upper 136 and the lower 137 specification limits. Finally, the report 130 includes columns showing statistics regarding the measurements. The statistics can include the number of the measurements tagged 138 with a manufacturing problem, the highest UMI 139 displayed for the surface profile characteristic, the lowest 140 UMI for the surface profile characteristic, the mean 141 for the UMIs of the surface profile characteristics displayed, the range 142 of the UMIs, and the UMI for the first article inspection 143.

Figure 12:
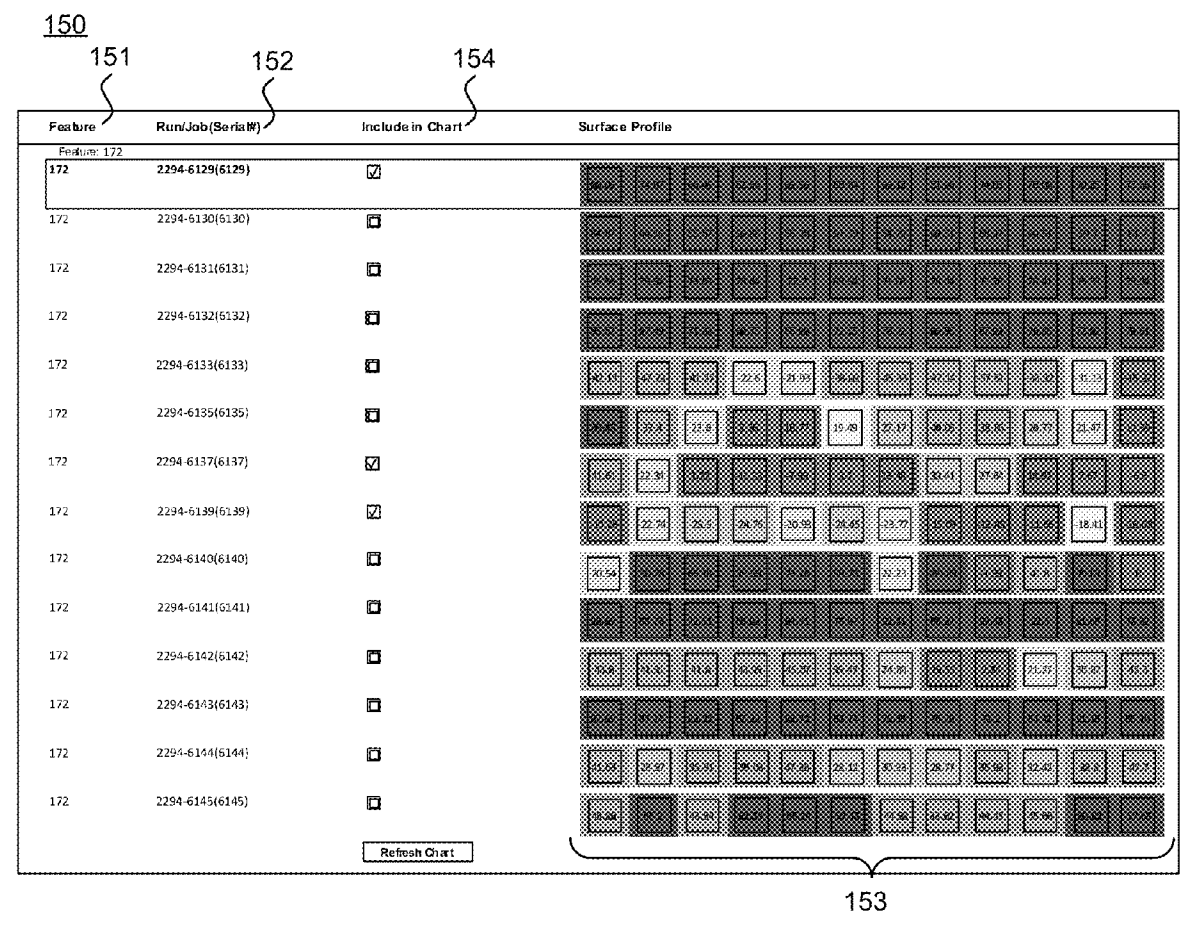

Selecting one of the surface profile characteristics, such as by clicking on the identification of the characteristic in the repot 130 with a mouse, allows a user to obtain additional details for each of the surface profile characteristics selected, which a user to identify patterns and locations on the surface where a current manufacturing process is incapable of holding required tolerances. FIG. 12 is a screenshot of the user interface of FIG. 1 showing a surface profile process map 150 for a selected surface profile characteristic in accordance with one embodiment. The map includes columns identifying the selected surface profile characteristic 151, a run (or job) number during which the profile characteristics measured were produced 152, and UMI of all of the measurements taken for the surface profile characteristics for each of the runs 153. An additional column 154 provides a way for a user to choose the UMIs for one of the runs to be included into the chart shown in FIG. 13.

Figure 13:
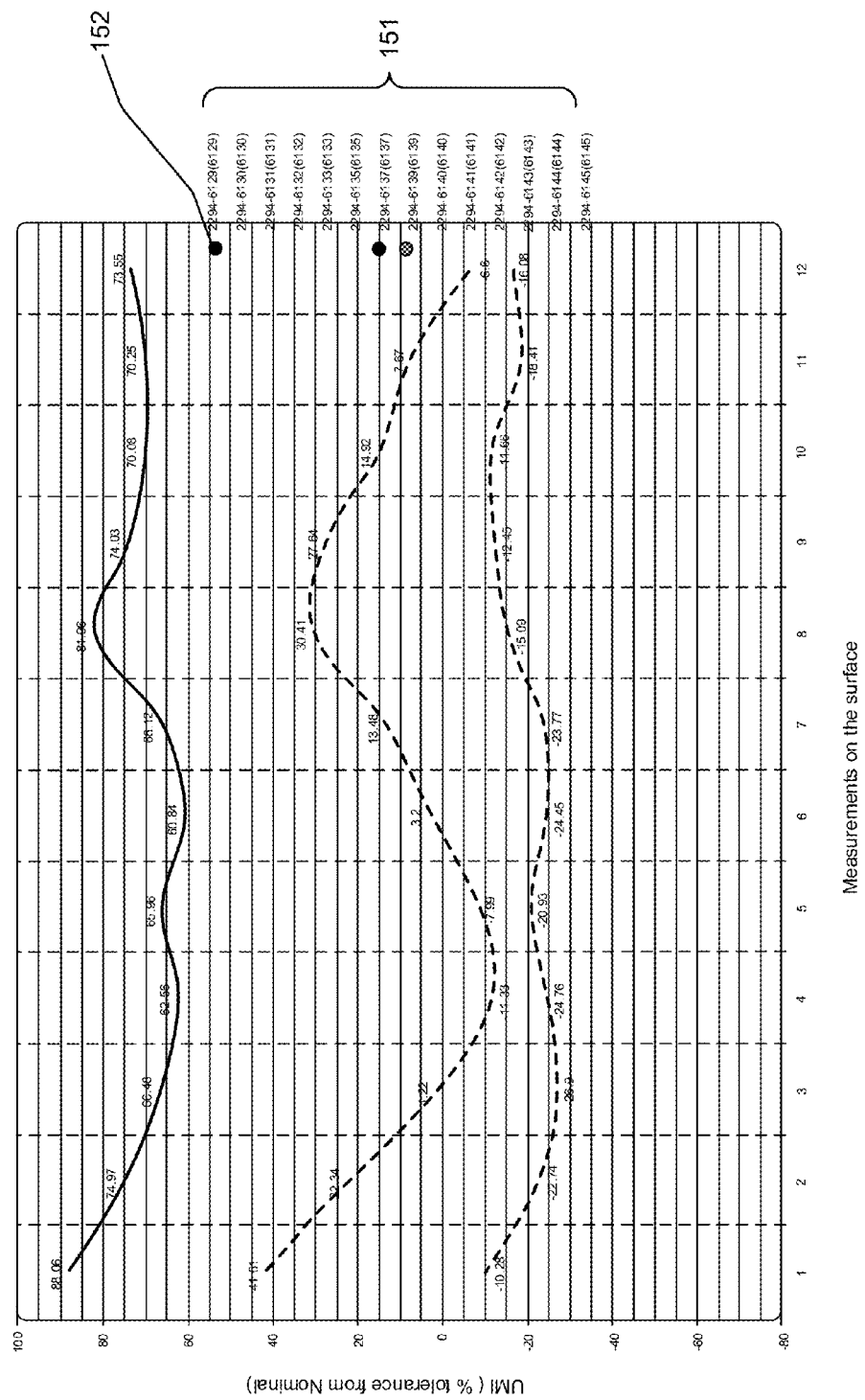
FIG. 13 is a screenshot of the user interface of FIG. 1 showing a process map run chart that includes a graph with the data for the selected runs in the map of FIG. 12 in accordance with one embodiment.

FIG. 13 is a screenshot of the user interface showing a process map run chart 160 that includes a graph with the data for the selected runs in the map 150 of FIG. 12 in accordance with one embodiment. The y-axis of the graph shows UMI above and below zero. The x-axis for the graph shows the number of measurements of the surface. The data points for the measurements are joined into a line that represents each of the runs. The lines can be of different colors or be visually distinguished from each other in other ways. The run numbers 151, including the runs selected by the user, can be also be displayed on the chart 150; an indicator 152 of the color for the line representing the run can be displayed next to the name of the run. In a further embodiment, the data for each of the runs can be shown in three dimensions.

While in the embodiment shown the surface profile process map 150 and chart 160 show data for the same surface profile characteristic manufactured during different runs, in a further embodiment, the map 150 and chart 160 can show data for different surface characteristics of different parts. In that embodiment, the data can be used to compare the surfaces of different parts and determine whether the parts are going to be compatible with each other.

Figure 14:
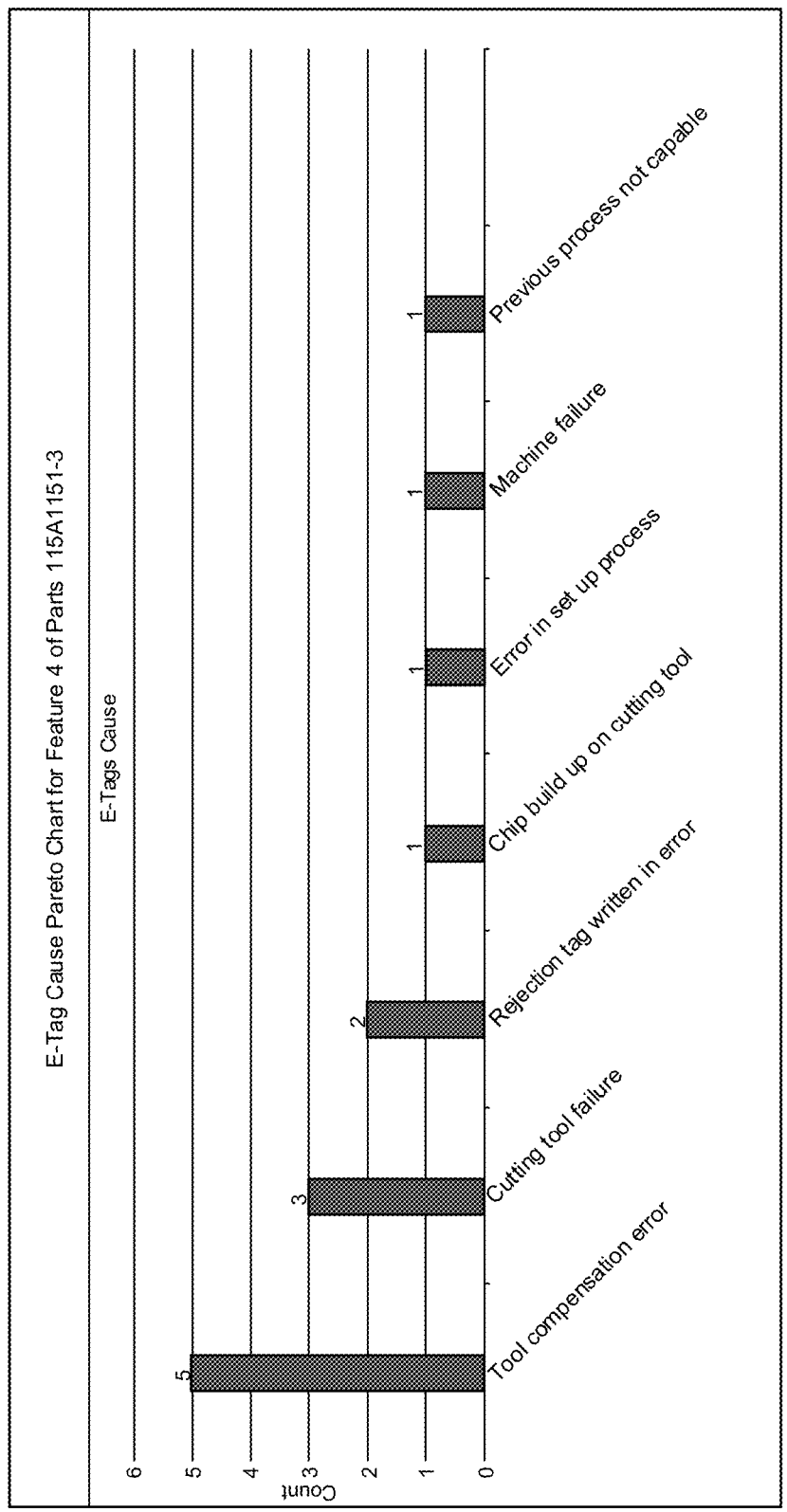
FIG. 14 is a screenshot of the user interface of FIG. 1 showing a report of causes for non-conformance of measurements in a predefined time period in accordance with one embodiment.

As mentioned above with reference to FIG. 1, the servers 11 can receive information regarding any problems associated production of the features measured. The information may be provided to the user along with other measurements attributes. The information may further be displayed to the user when the user receives a listing of attributes for the measurements, such as described above with reference to FIGS. 7 and 10 above. In addition, a separate report can be created showing the frequency of particular causes for non-conformance of features in a particular time period. FIG. 14 is a screenshot of the user interface of FIG. 1 showing a report 170 of causes for non-conformance of measurements in a predefined time period in accordance with one embodiment. The time period can include any time interval, such as a month, a week, a day, or other intervals. The report includes a bar graph of the causes. The y-axes of the graph shows the count of each of the causes, the number of times the cause appeared. The x-axis shows names of the causes of non-conformance. The bars for each of the causes show the number of times the cause has appeared in the time period. In a further embodiment, instead of a bar graph, the report 170 can include a Pareto chart using the same data as in the bar graph. The displayed causes of nonconformance can allow a manufacturer to correct the causes, increase the capability of the manufacturing process, and the quality of the parts.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for capability zone-based manufacturing quality control, comprising:
   a database, comprising:
      a specification for manufacturing a part feature, the specification comprising a nominal and a tolerance;
      a plurality of measurements for the feature;
   a processor configured to execute code, comprising:
      a difference module configured to determine a difference between the nominal and each of the measurements;
      a comparison module configured to compare the difference for each of the measurements to the tolerance and to express the difference as a value comprising one of a percentage of the tolerance and a fraction of the tolerance;
      an assignment module configured to assign each of the measurements into one of a plurality of capability zones of measurements based on the calculated values, each of the capability zones associated with one or more value intervals and comprising those of the measurements for which the calculated values fall within one of the value intervals associated with that capability zone, wherein the value intervals associated with each of the capability zones differ from the value intervals associated with the remaining capability zones; and
      an output module configured to output visual representations of the capability zones into which the measurements were assigned.

2. A system according to claim 1, wherein the visual representation of each of the capability zones comprises a color different from colors of the remaining capability zones.

3. A system according to claim 2, wherein the capability zones comprise a 6 Sigma zone with the visual representation comprising a shade of the color green, a 5 Sigma zone with the visual representation comprising a different shade of the color green, a 4 Sigma zone with the visual representation comprising a third shade of the color green, a 3 Sigma zone with the visual representation comprising the color yellow, a 2 Sigma zone with the visual representation comprising the color orange, a 1 Sigma zone with the visual representation comprising the color red, and the Out of Tolerance zone with the visual representation comprising the color purple.

4. A system according to claim 1, further comprising:
   a representation module configure to represent each of the capability zones with a bar in a bar graph, wherein a height of each of the bars is proportional to a number of measurements assigned into that capability zone.

5. A system according to claim 1, further comprising:
   a receipt module configured to receive a user selection of the visual representation of one of the capability zones; and
   a listing module configured to display a listing of the measurements assigned into the selected capability zone.

6. A system according to claim 1, further comprising at least one:
   an identification module configured to identify one or more attributes associated with each of the measurements;
   a selection module configured to receive a selection of one or more of the attributes from a user;
   an identification module configured to identify the measurements associated with the selected attributes; and
   a score module configured to calculate a capability score for the selected attributes based on the capability zones into which the identified measurements are assigned.

7. A system according to claim 6, further comprising:
   a receipt module configured to receive a selection of all of the attributes in a category; and
   a ranking module configured to rank the attributes in the category based on the capability scores of each of the attributes.

8. A system according to claim 6, further comprising:
   a weight module configured to give each of the identified measurements a weight based on one of the capability zones into which that measurement is assigned into, wherein the score is calculated based on the assigned weight.

9. A system according to claim 8, wherein each of the identified measurements is further weighed based on at least one of an age of that measurement, a degree to which that measurement aligns with a prediction for that measurement, and a number of trailing zeros in the measurement.

10. A system according to claim 1, further comprising:
    a background module configured to display the value for one of the measurements on a background, the background comprising a color of the visual representation of the capability zone into which the displayed measurement was assigned.

11. A computer-implemented method for capability zone-based manufacturing quality control, comprising the steps of:
    obtaining a specification for manufacturing a part feature, the specification comprising a nominal and a tolerance;
    obtaining a plurality of measurements for the feature;
    determining a difference between the nominal and each of the measurements;
    comparing the difference for each of the measurements to the tolerance and expressing the difference as a value comprising one of a percentage of the tolerance and a fraction of the tolerance;
    assigning each of the measurements into one of a plurality of capability zones of measurements based on the calculated values, each of the capability zones associated with one or more value intervals and comprising those of the measurements for which the calculated values fall within one of the value intervals associated with that capability zone, wherein the value intervals associated with each of the capability zones differ from the value intervals associated with the remaining capability zones; and
    outputting visual representations of the capability zones into which the measurements were assigned, wherein the steps are performed on a suitably programmed computer.

12. A method according to claim 11, wherein the visual representation of each of the capability zones comprises a color different from colors of the remaining capability zones.

13. A system according to claim 12, wherein the capability zones comprise a 6 Sigma zone with the visual representation comprising a shade of the color green, a 5 Sigma zone with the visual representation comprising a different shade of the color green, a 4 Sigma zone with the visual representation comprising a third shade of the color green, a 3 Sigma zone with the visual representation comprising the color yellow, a 2 Sigma zone with the visual representation comprising the color orange, a 1 Sigma zone with the visual representation comprising the color red, and the Out of Tolerance zone with the visual representation comprising the color purple.

14. A method according to claim 11, further comprising:
representing each of the capability zones with a bar in a bar graph,
wherein a height of each of the bars is proportional to a number of measurements assigned into that capability zone.

15. A method according to claim 11, further comprising:
receiving a user selection of the visual representation of one of the capability zones; and
displaying a listing of the measurements assigned into the selected capability zone.

16. A method according to claim 11, further comprising at least one:
identifying one or more attributes associated with each of the measurements;
receiving a selection of one or more of the attributes from a user;
identifying the measurements associated with the selected attributes; and
calculating a capability score for the selected attributes based on the capability zones into which the identified measurements are assigned.

17. A method according to claim 16, further comprising:
receiving a selection of all of the attributes in a category; and
ranking the attributes in the category based on the capability scores of each of the attributes.

18. A method according to claim 16, further comprising:
giving each of the identified measurements a weight based on one of the capability zones into which that measurement is assigned into,
wherein the score is calculated based on the assigned weight.

19. A method according to claim 18, wherein each of the identified measurements is further weighed based on at least one of an age of that measurement, a degree to which that measurement aligns with a prediction for that measurement, and a number of trailing zeros in the measurement.

20. A method according to claim 11, further comprising:
displaying the percentage value for one of the measurements on a background, the background comprising a color of the visual representation of the capability zone into which the displayed measurement was assigned.

* * * * *